United States Patent Office 3,141,033
Patented July 14, 1964

3,141,033
PRODUCTION OF GLYCOLIC ACID NITRILE
Franz Koenig, Offenbach (Main), Germany, assignor to Deutsche Gold- und Silber-Scheideanstalt vormals Roessler, Frankfurt am Main, Germany
No Drawing. Filed Oct. 26, 1961, Ser. No. 147,742
Claims priority, application Germany Nov. 2, 1960
3 Claims. (Cl. 260—465.6)

The present invention relates to an improved process for the production of glycolic acid nitrile and more particularly relates to a process for the production of such compound from semiacetals of formaldehyde and hydrogen cyanide.

The production of cyanhydrins from aldehydes or ketones and hydrocyanic acid is generally known and is carried out on large technical scale. In the previously known processes for the production of the cyanohydrin from formaldehyde, aqueous solutions of formaldehyde were employed which, however, are only stable with a formaldehyde content up to about 35 to 40%. When such solutions are reacted with HCN aqueous solutions of glycolic acid nitrile are produced of a maximum concentration of about 50 to 55%, which must then be concentrated by distillation to produce the pure cyanhydrin. In view of the sensitivity of glycolic acid nitrile, the concentration of its aqueous solutions is difficult to carry out and always coupled with incidence of decomposition which reduces the yield of pure glycolic acid nitrile.

According to the invention it was found that water free glycolic acid nitrile or water free solutions of glycolic acid nitrile can be produced by reacting hydrogen cyanide with semiacetals of formaldehyde in the presence of a tertiary amine. This reaction leads to quantitative yields and it is surprising that the semiacetal reacts with hydrogen cyanide under the alkaline reaction conditions employed as acetals are relatively stable in an alkaline medium and an intermediate reformation of aldehyde and alcohol was not to be expected.

The methyl semiacetal of formaldehyde is particularly suited as the semiacetal starting material for the process according to the invention, as it is easily available in large industrial quantities. However, other semiacetals of formaldehyde, such as, for example, other lower alkyl semiacetals, such as the ethyl, propyl and isopropyl semiacetals, can be used just as well. For special applications, higher boiling aliphatic or cycloaliphatic alcohols can be employed for the production of the formaldehyde semiacetal. In reacting with the hydrogen cyanide the semiacetal is converted to the cyanhydrin with liberation of the alcohol and as a consequence the glycolic acid nitrile produced is diluted by the alcohol component of the semiacetal. The methyl semiacetal of formaldehyde is preferred above all others for technical economical reasons.

Liquid hydrogen cyanide is preferably employed according to the invention. As the reaction between hydrogen cyanide and the semiacetal takes place practically instantaneously it is also possible to employ gaseous hydrogen cyanide as well as diluted gaseous hydrogen cyanide, such as is, for example, obtained in the synthesis of hydrogen cyanide from methane and ammonia which in general contains about 22% of hydrogen cyanide.

The reaction between the semiacetals and the hydrogen cyanide is most successful with a pH range of 7.5 to 8.5 and it is especially advantageous to carry out the reaction at a pH between 7.5 and 8. This pH range can be provided by the addition of alkaline substances of which tertiary amines and especially tertiary aliphatic amines, preferably tributyl amine, have proved most suited.

The reaction initiates immediately with strong evolution of heat when the reaction components are combined in the presence of the alkaline catalyst. If the reaction is carried out by preparing a mixture of the semiacetal and the catalyst and adding the hydrogen cyanide thereto, the hydrogen cyanide reacts in the quantity it is supplied. As long as a sufficient quantity of acetal is present, hydrogen cyanide can no longer be detected after only a short time after its addition. As a consequence, escape of gaseous hydrogen cyanide need not be feared when for example, a hydrogen cyanide synthesis gas is employed. Appropriate cooling is employed to provide a reaction temperature between 0 and 25° C., preferably between 5 and 15° C.

The process according to the invention is particularly suited for the production of water free glycolic acid nitrile. As a consequence, starting materials are employed which are as water free as possible. The non-aqueous alcoholic solution of glycolic acid nitrile which is obtained directly as the reaction product can easily be processed to recover pure water white glycolic acid nitrile by distilling off the alcohol and distilling the glycolic acid nitrile under vacuum. The cumbersome and costly distillation to effect dehydration is avoided. Often the alcoholic solution can be used directly for further reactions requiring water free glycolic acid nitrile. The alcoholic reaction solutions theoretically can contain 64% of glycolic acid nitrile. However, solutions containing up to 85% of glycolic acid nitrile can be obtained according to the invention by employing a semiacetal which also contains free formaldehyde dissolved therein. It is possible for this purpose simply to use a semiformal saturated with formaldehyde.

The following examples will serve to illustrate the invention.

Example 1

5 mol (310 g.) of methyl semiformal were placed in a stirring vessel provided with a cooling arrangement, a thermometer and a supply inlet. A sufficient quantity of tributyl amine was added thereto to adjust the pH to 7.5–8 and the mixture cooled to 5° C. Thereafter, 5 mol (135 g.) of liquid hydrogen cyanide were added while stirring and cooling so as to maintain a temperature of 5 to 10° C. 5 minutes after all of the hydrogen cyanide had been added a sample of the reaction mixture was taken and tested for HCN. It was found HCN free. 443 g. of reaction mixture were obtained. The pH thereof was adjusted to 1.5 with phosphoric acid (sulfuric acid could also be used) and the methanol driven off under a partial vacuum and the glycolic acid nitrile distilled off under a water jet vacuum of 16 mm. Hg. 278 g. of glycolic acid nitrile (98% of the theoretical yield) of a boiling point of 102–103° C. at 16 mm. Hg were recovered. Before the distillation the reaction solution contained 62.8% of glycolic acid nitrile.

Example 2

The procedure of Example 1 was repeated except that the methyl semiformal contained 12% of free formaldehyde dissolved therein so that the solution contained a total (free+bound) of 60% of formaldehyde. 400 g. thereof corresponding to 8 mol of formaldehyde were reacted with 216 g. (=8 mol) of water free liquid HCN. The resulting methanol containing HCN free water white reaction product contained 448 g. of glycolic acid nitrile in a 73.5% concentration. The yield was 96% of the theoretical.

Example 3

The procedure of Example 1 was repeated except that the methyl semiformal employed contained 27% of free formaldehyde dissolved therein so that the solution contained a total of 75% of formaldehyde. 300 g. thereof corresponding to 7.5 mol (=225 g.) of formaldehyde were reacted with 7.5 mol (=202.5 g.) of water free liquid HCN. The HCN free methanol containing reaction mixture weighed 498 g. containing 85% (422.5 g.) of glycolic acid nitrile. The yield therefore was 98.5% of the theoretical.

I claim:

1. A process for the production of glycolic acid nitrile which comprises reacting hydrogen cyanide with a lower alkyl semiacetal of formaldehyde in the presence of tributyl amine at a pH of between about 7.5 and 8.5 and at a temperature between 0 and 25° C.

2. The process of claim 1 in which said semiacetal is methyl semiformal.

3. A process for the production of glycolic acid nitrile which comprises reacting hydrogen cyanide with a mixture essentially consisting of methyl semiformal and free formaldehyde in the presence of tributyl amine at a pH of between about 7.5 and 8.5 and at a temperature between 0 and 25° C.

No references cited.